United States Patent [19]

Gellert et al.

[11] Patent Number: 4,917,594
[45] Date of Patent: Apr. 17, 1990

[54] INJECTION MOLDING SYSTEM WITH GAS FLOW THROUGH VALVE GATE

[75] Inventors: Jobst U. Gellert; Harald H. Schmidt, both of Georgetown, Canada

[73] Assignee: Mold-Masters Limited, Georgetown, Canada

[21] Appl. No.: 398,990

[22] Filed: Aug. 28, 1989

Related U.S. Application Data

[63] Continuation-in-part of Ser. No. 331,166, Mar. 31, 1989, abandoned.

[30] Foreign Application Priority Data

Feb. 28, 1989 [CA] Canada .................................. 592345
Jul. 19, 1989 [CA] Canada .................................. 606079

[51] Int. Cl.$^4$ ............................................. B29C 45/23
[52] U.S. Cl. .................................. 425/549; 264/328.8; 264/328.9; 264/328.15; 264/572; 425/564; 425/566; 425/568; 425/573
[58] Field of Search ................. 264/328.8, 328.9, 572, 264/328.12, 328.15; 425/549, 562, 563, 564, 566, 567, 568, 570, 573, 577, 817 R

[56] References Cited

U.S. PATENT DOCUMENTS

| | | | |
|---|---|---|---|
| 4,101,617 | 7/1978 | Friederich | 264/572 |
| 4,129,635 | 12/1978 | Yasuike et al. | 264/328.12 |
| 4,234,642 | 11/1980 | Olabisi | 264/572 |
| 4,555,225 | 11/1985 | Hendry | 425/817 R |

Primary Examiner—Jay H. Woo
Assistant Examiner—Timothy W. Heitbrink
Attorney, Agent, or Firm—Riches, McKenzie & Herbert

[57] ABSTRACT

A valve gated injection molding system for making hollow plastic products. A fixed pin extends through an elongated hollow valve member which is reciprocated between a retracted open position and a forward closed position in which the forward end of the valve member is seated in the gate. The fixed pin has a hollow portion for the flow of pressurized gas to a porous portion at the forward end which is centrally located in the gate. In the open position, gas from the fixed pin flows into the hollow center of a stream of melt which flows into the cavity around the forward end of the fixed pin to form a melt bubble in the cavity.

9 Claims, 5 Drawing Sheets

INJECTION MOLDING SYSTEM WITH GAS FLOW THROUGH VALVE GATE

This application is a continuation-in-part of application Ser. No. 331,166 filed March 31, 1989 now abandoned.

BACKGROUND OF THE INVENTION

This invention relates to injection molding and more particularly to a valve gated system for making plastic products with a gas filled central portion.

Molding hollow plastic products by injecting pressurized gas in the center of a stream of melt is described in U.S. Pat. No. 4,101,617 to Friederich which issued July 18, 1978. However, this previous arrangement has the disadvantage, particularly for large size products which require a larger diameter gate, that the gate cannot be shut off. Consequently melt drooling when the mold opens and increased cycle time become problems.

SUMMARY OF THE INVENTION

Accordingly, it is an object of the invention to at least partially overcome the problems of the prior art by providing a gas injection system which is valve gated.

To this end, in one of its aspects, the invention provides a valve gated hot runner injection molding system having a heated nozzle seated in a well in a cavity plate, the nozzle having a central bore extending therethrough to receive an elongated valve member with a forward end and a rear end and to provide a melt passage which extends in the central bore around at least at forward portion of the valve member to convey melt to a gate extending through the cavity plate to a cavity, and valve member actuating means to reciprocate the valve member longitudinally between a retracted open position and a forward closed position in which the forward end of the valve member is seated in the gate having the improvement wherein the elongated valve member is hollow and receives centrally therein an elongated pin having a forward end and a rear end, the pin being securely mounted in a fixed position wherein the forward end is centrally received in the gate with a space therearound which provides a stream of melt with a hollow center flowing into the cavity when the valve member is retracted to the open position, the pin having a hollow central portion extending from an inlet near the rear end of the pin to an outlet at the forward end of the pin, whereby pressurized gas received at the inlet to the hollow pin flows through the outlet into the hollow center of the stream of melt flowing into the cavity.

Further objects and advantages of the invention will appear from the following description, taken together with the accompanying drawings.

DETAILED DESCRIPTION OF THE DRAWINGS

Figure 1:
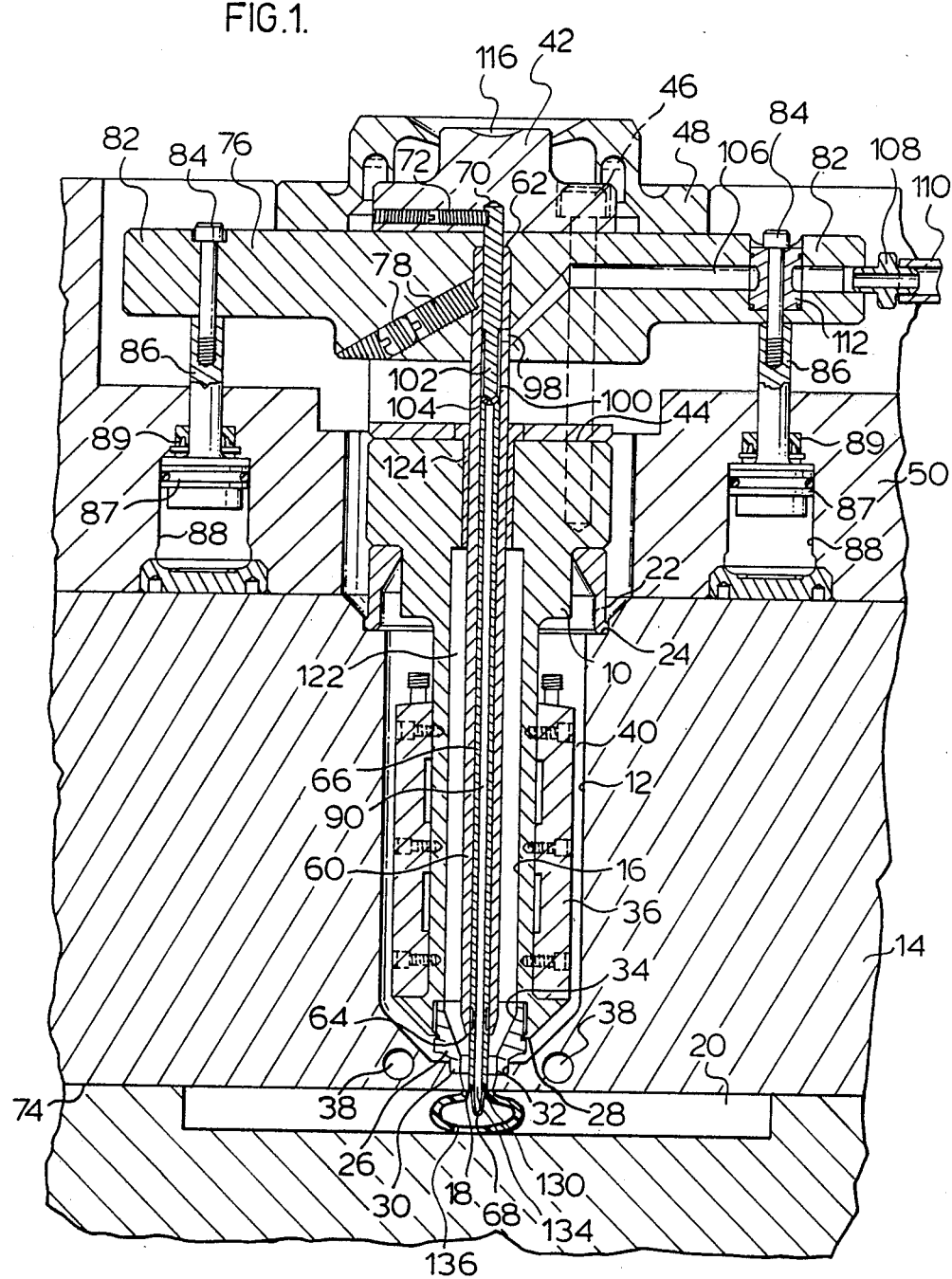
FIG. 1 is a sectional view of a portion of an injection molding system according to one embodiment of the invention showing the valve member in the open position.

Reference is first made to FIG. 1 which shows a valve gated injection molding system according to one embodiment of the invention having a nozzle 10 seated in a well 12 in a cavity plate 14. The nozzle 10 has a central bore 16 which is aligned with a gate 18 which extends through the cavity plate 14 to a cavity 20. The nozzle 10 is accurately located in this position by an insulating flange 22 which seats against a circumferential shoulder 24 and by a nozzle seal insert 26. The nozzle seal insert 26 which is screwed into the forward end 28 of the nozzle 10 has a cylindrical nose portion 30 which is received in a seat 32 around the gate 18 and a tapered bore 34 which is an alignment with and extends from the central bore 16 of the nozzle 10 to the gate 18. Electric plate heaters 36 as described in Gellert's Canadian patent application Ser. No. 589,783 filed Feb. 1, 1989 entitled "Profiled Plate Heaters for Injection Molding Nozzles" are mounted on opposite sides of the nozzle 10 to heat the nozzles 10. The cavity plate 14 is cooled by pumping cooling water through conduits 38 and an insulative air space 40 is provided between the heated nozzle 10 and the surrounding cooled cavity plate 14.

Figure 3:
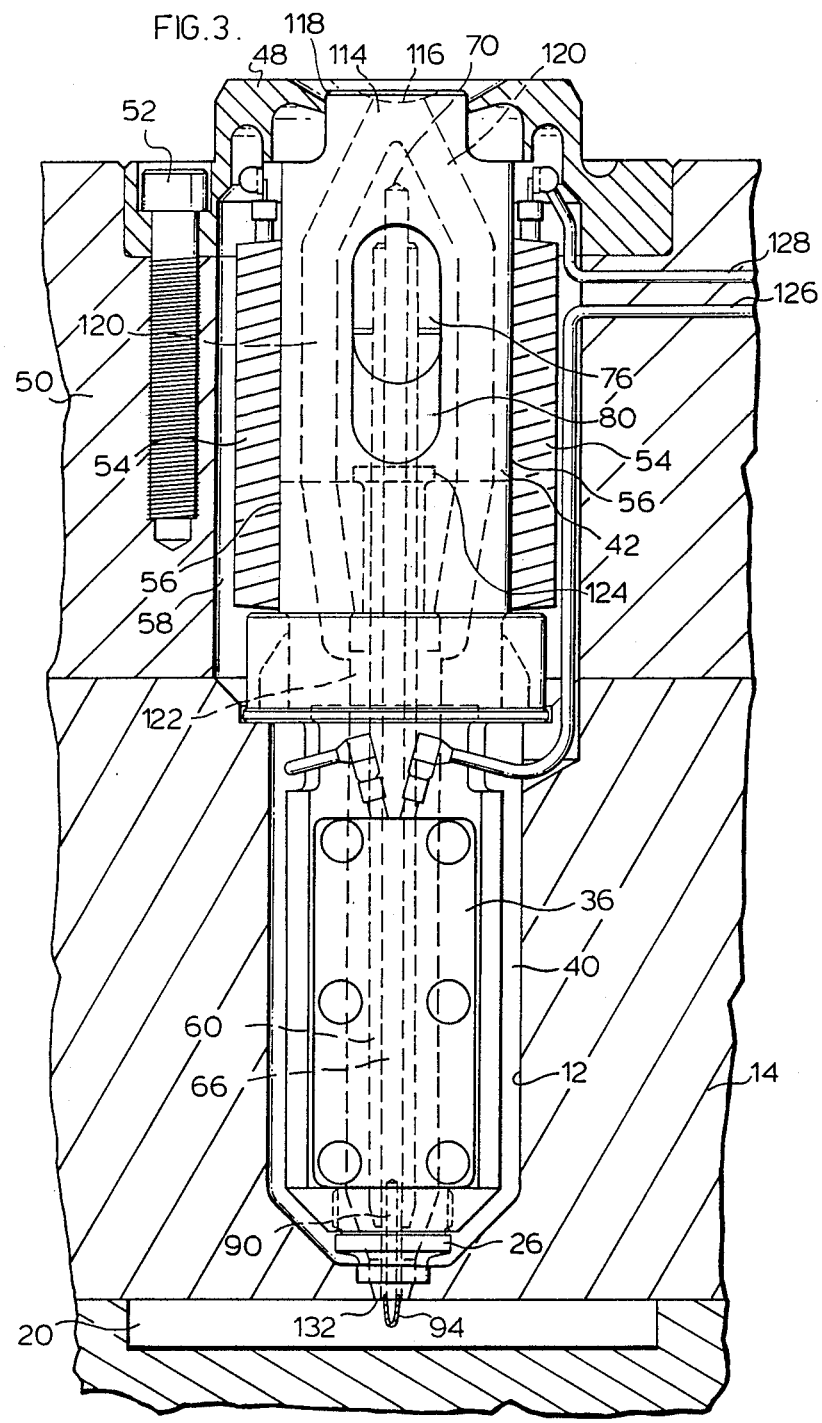
FIG. 3 is a partial sectional view at a right angle to FIG. 1.

A manifold 42 is secured to the rear end 44 of the nozzle 10 by bolts 46. The manifold 42 and the nozzle 10 are held in place by a locating collar 48 which is fastened to the back plate 50 by bolts 52. The back plate 50 is, in turn, mounted to the cavity plate 14 by bolts which are not shown. As seen in FIG. 3, the manifold 42 is heated by electric plate heaters 54 attached to opposite sides 56. The heated manifold 42 is thermally separated from the surrounding cooled back plate 50 by an insulative air space 58, with only minimum contact with the locating collar 48.

Figure 2:
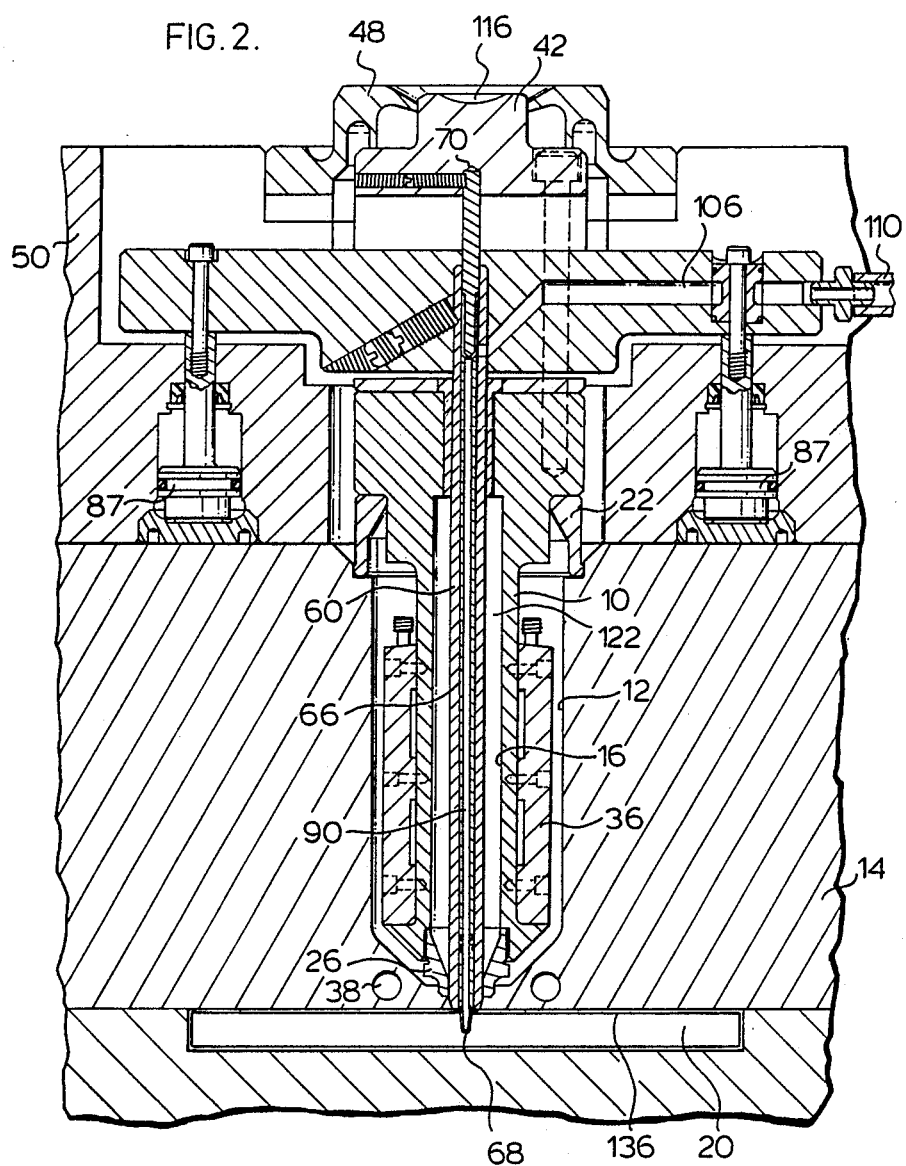
FIG. 2 is a similar sectional view showing the valve member in the closed position.

The central bore 16 of the nozzle 10 has a hollow elongated steel valve member 60 extending centrally therein. In this embodiment, the valve member 60 has a generally uniform cross section extending from a rear end 62 to a forward end 64. As can be seen, the hollow valve member 60 has an elongated steel pin 66 extending through it. The pin 66 has a forward end 68 and a rear end 70 which extends rearwardly into the manifold 42 where it is secured by a set screw 72. This fixes the pin 66 in a position in which the forward end 68 extends centrally through the gate 18. The valve member 66 is similarly secured to a movable actuating yoke 76 by double set screws 78. The steel yoke 76 extends transversely through an opening 80 in the manifold 42. The outer ends 82 of the yoke 76 are each connected by a screw 84 to a rod 86 extending from a pneumatically actuated piston 87 in a cylinder 88 seated in the back plate 50. A high pressure seal 89 extends around each piston rod 86 to prevent leakage. The pair of pistons 87 are activated in unison according to a predetermined cycle to reciprocate the yoke 76 and the valve member 60 between the retracted open position shown in FIG. 1 and the forward closed position shown in FIG. 2 in which the forward end 64 of the valve member is seated in the gate 18.

Figure 4:
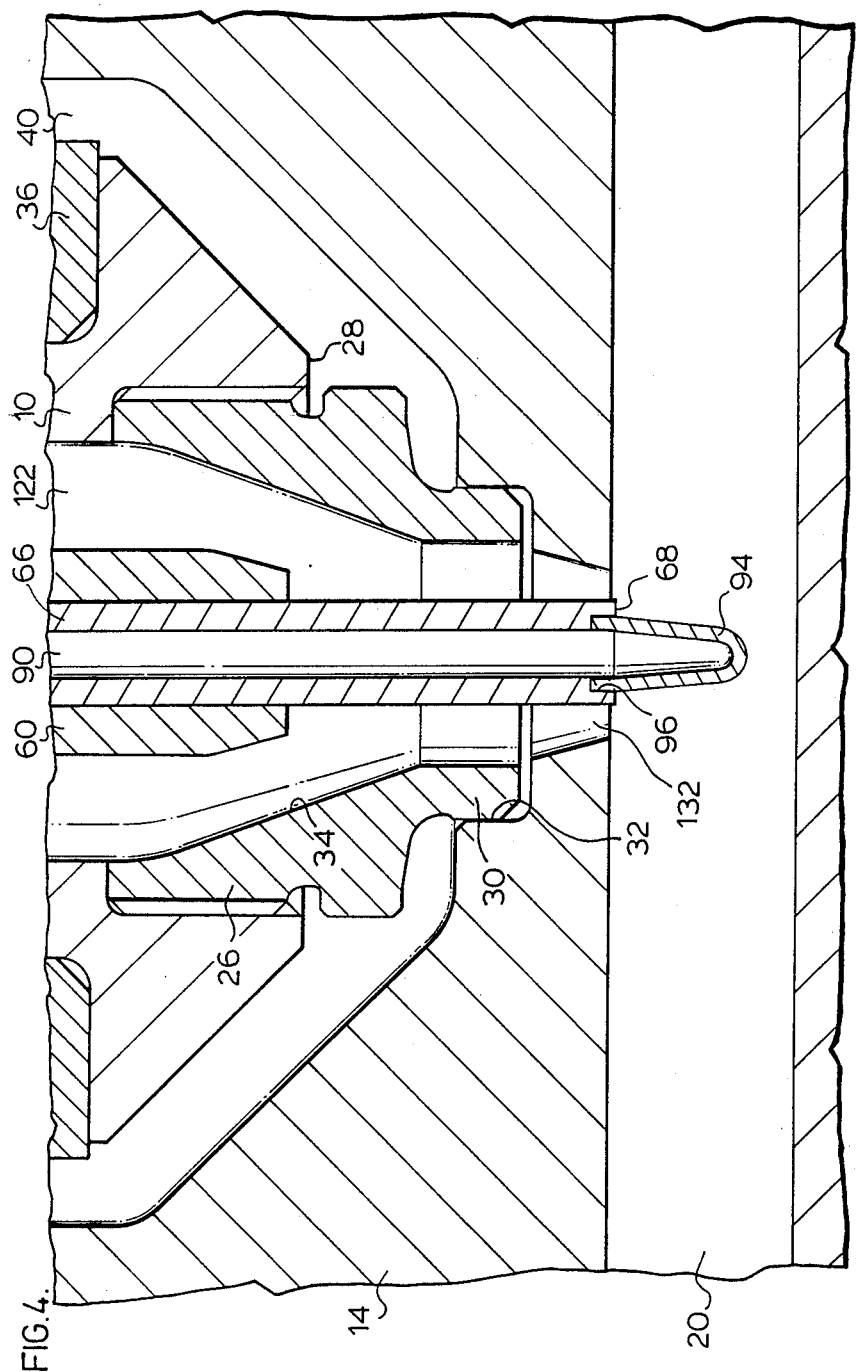
FIG. 4 is an enlarged sectional view showing the area of the gate.

The fixed pin 66 has a hollow central portion 90 which extends to convey gas from an inlet towards the rear end 70 of the pin 66 to an outlet at the forward end 68 of the pin 66. As best seen in FIG. 4, the outlet is formed by a porous stainless steel portion 94 which is securely welded in a seat 96 at the forward end 68 of the pin 66 and projects into the cavity 20. The porous portion 94 is formed by sintering stainless steel powder which allows a sufficient flow of gas outward into the cavity 20, while preventing melt from the cavity 20 flowing back in to the hollow central portion 90. The inlet to the hollow central portion 90 of the fixed pin 66 is provided by a lateral opening 98 through one side of the valve member 60 which connects to a circumferential space 100 around a reduced diameter portion 102 of the fixed pin 66. This space 100 is, in turn, connected to the hollow central portion 90 of the pin 66 by diagonally extending ducts 104. The length of the reduced diameter portion 102 of the fixed pin 66 is at least equal to the travel of the valve member 66 to provide a continuous connection to the opening 98 throughout the travel of the valve member 66. The yoke 76 has a gas duct 106 which extends laterally outward from the opening 98 through the valve member 60 to a connector 108 from a gas supply hose 110. As can be seen, in this embodiment, a specially shaped bushing 112 is provided around the screw 84 to the piston rod 86 so the gas duct 106 can bypass the screw 84.

As seen in FIG. 3, a melt passage 114 extends to convey pressurized melt from a central inlet 116 at the rear end 118 of the manifold 42 to the gate 18. The passage 114 splits into two passages 120 to bypass the transverse opening 80 through the manifold 42 in which the yoke 76 reciprocates and join a space 122 around the outside of the valve member 60 in the central bore 16. A sealing sleeve 124 seated around the valve member 60 in the central bore 16 at the rear end 44 of the nozzle 10 prevents leakage of the pressurized melt as the valve member 60 reciprocates. The sleeve 124 also helps to locate the nozzle 10 relative to the manifold 12 and to centrally locate the valve member 60 and the fixed pin 66 inside it.

In use, the system is assembled as shown and electrical power is applied to the leads 126,128 to the plate heaters 36,54 to heat the nozzle 10 and the manifold 42 to a predetermined operating temperature. Pressurized melt from a molding machine (not shown) is injected into the melt passage 114 through the central inlet 116 according to a predetermined cycle. A pressurized gas such as nitrogen or air is applied through the hose 110 and pneumatic pressure is also applied to the cylinder 88 according to the cycle. Thus, when the pneumatic pressure actuates the yoke 76 and the valve member 60 to the retracted open position, injection melt pressure and gas pressure are applied. This produces a stream 130 of melt which flows into the cavity 20 through a space 132 around the porous portion 94 at the forward end 68 of the fixed pin 66. The stream 130 of melt has a hollow center 134 into which the pressurized gas flows through the holes 92 in the forward end 68 of the fixed pin 66. As seen in FIG. 1, this produces a melt bubble 136 which expands until it contacts the walls of the cavity 20. After there is a build up of gas pressure in the filled mold, the pistons 87 drive the yoke 76 and the valve member 60 to the forward closed position shown in FIG. 2 in which the forward end 64 of the valve member 60 is seated in the gate 18. Injection pressure is then released and after a short cooling period, the gas pressure is released and a suction can be applied so the walls do not blow when the mold is opened. The mold is then opened along the parting line 74 to eject the hollow molded product.

After ejection, the mold is closed and hydraulic pressure is reapplied to the cylinders 88 to withdraw the valve member 60 to the open position and injection and gas pressure are reapplied to refill the cavity 20. This cycle is repeated continuously with a frequency dependent upon the size of cavity and type of material being molded.

Figure 5:
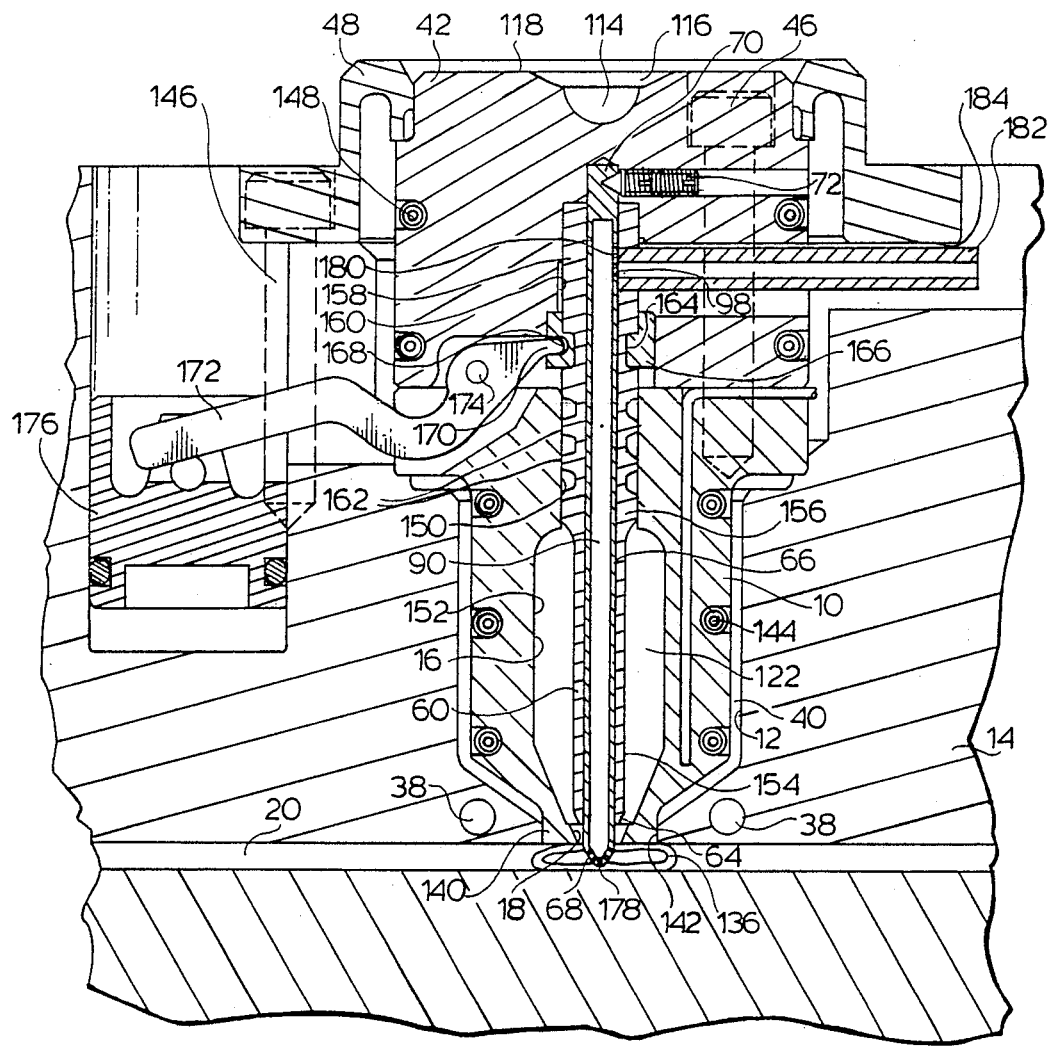
FIG. 5 is a sectional view of a portion of an injection molding system according to another embodiment of the invention.

FIG. 5 illustrates an injection molding system according to another embodiment of the invention. The elements of this embodiment which are common to the first embodiment described above are described and illustrated using the same reference numerals. In this case, the nozzle 10 is similarly seated in well 12 in the cavity plate 14. However, in this embodiment, the nozzle 10 has a cylindrical nose portion 140 which is received in an opening 142 through the cavity plate 14 to provide the tapered gate 18 leading to the cavity 20. The nozzle 10 is heated by an integral helical electrical heating element 144 and has an insulative air space 40 between it and the surrounding cavity plate 14 which is cooled by pumping cooling water through conduits 38. The nozzle 10 is secured by bolts 46 to a manifold 42. The manifold 42 and the nozzle 10 are secured in place by a locating collar 48 which is fastened to the cavity plate 14 by bolts 146. The manifold 42 is also heated by a helical electric heating element 148 which is integrally brazed into it.

The nozzle 10 has a central bore 16 with a rear portion 150 and a larger diameter forward portion 152 which leads to the gate 18. A hollow elongated steel valve member 60 is received in the central bore 16 in the nozzle 10. The valve member 60 has a forward portion 154, a central portion 156 which extends through the rear portion 150 of the central bore 16, and a rear portion 158 which extends into a central opening 160 in the manifold 42. As can be seen, the forward portion 154 of the valve member 60 is smaller in diameter than the surrounding forward portion 152 of the central nozzle bore 16 which provides a melt flow space 122 between them. A melt passage 114 extends to convey pressurized melt from a central inlet 116 at the rear end 118 of the manifold 42 to the gate 18. The passage 114 splits into two branches (not shown) which extend out around the opening 160 in the manifold and join the space 122 around the valve member 60 in the central bore 16. The central portion 156 of the valve member 60 has a number of spaced ridges 162 which fit in the rear portion 150 of the central nozzle bore 16 through the nozzle 10 to prevent leakage of pressurized melt around the reciprocating valve member 60.

The rear portion 158 of the valve member 60 which extends into the central opening 160 in the manifold 42 has a smaller diameter neck portion 164 around which a split ring 166 is mounted. The split ring 166 has two opposing segments which are received in the opening 160 around the neck portion 164 of the valve member 66 as described in detail in Gellert's Canadian patent application Ser. No. 601,623 filed June 2, 1989 entitled "Injection Molding System Valve Member Split Ring". One of the segments of the split ring 166 has a notch 168 to receive the inner end 170 of a pivotal lever member 172. In this embodiment of the invention, the lever member 172 is part of the valve member actuating mechanism which applies a force through the split ring 166 to reciprocate the valve member 60 between a retracted open position and a forward closed position in which the forward end 64 of the valve member 60 is seated in the gate 18. In this embodiment, the lever member 172 which pivots around pivot pin 174, is driven by a pneumatic piston 176 to which pressurized air is applied according to a controlled cycle.

The hollow valve member 60 has a hollow elongated steel pin 66 extending through it. While the valve member 60 reciprocates, as described above, the pin 66 is fixed in place by its rear end 70 being secured in the manifold by a double set screw 72. As can be seen, in this fixed position, the forward end 68 of the fixed pin 66 extends centrally through the gate 18. The fixed pin 66 has a hollow central portion 90 which conveys gas from an inlet near the rear end 70 of the pin 66 to an outlet at the forward end 68 of the pin 66. The outlet is provided by a number of small holes 178 at the forward end 68 of the pin. The holes 178 are large enough to allow a sufficient flow of gas outward into the cavity 20, but small enough to prevent melt from the cavity 20 flowing back in through the holes 178. The inlet to the hollow central portion 90 of the fixed pin 66 is similarly provided by a slot 180 extending radially through the pin 66 near the rear end 70. The slot 180 in the fixed pin 66 is long enough to be in continuous with a lateral opening 98 in one side of the reciprocating valve member 60. The lateral opening 98 in the valve member receives a gas conduit 182 which extends outwardly through an opening 184 in the manifold 42 to connect to a conventional gas supply (not shown).

The operation of this embodiment of the invention is similar to that described above in regard to the first embodiment with the valve member 60 being actuated by the lever member 172 and the pressurized gas flowing in through the conduit 182. However, in this embodiment, the valve member 60 is only driven to the forward closed position by the actuating mechanism and is driven open by the melt injection pressure. However, in other embodiments, the actuating mechanism can be double acting as well as single acting.

While the description of the valve gated injection molding system with gas flow through a central fixed pin has been given with respect to preferred embodiments, it is not to be construed in a limiting sense. Variations and modifications will occur to those skilled in the art. For instance, alternate configurations can be provided to fix the pin 66 in place and to supply the gas to the hollow central portion 90. Also, different actuating mechanism can be used to reciprocate the valve member 60 between the open and closed positions. Also the porous portion 94 can be replaced by a flat portion seated in the forward end 68 of the pin with small tapered holes cut through it with a laser drill. Reference is made to the appended claims for a definition of the invention.

What we claim is:

1. In a valve gated hot runner injection molding apparatus having a heated nozzle seated in a well in a cavity plate, the nozzle having a central bore extending therethrough to receive an elongated valve member with a forward end and a rear end and to provide a melt passage which extends in the central bore around at least a forward portion of the valve member to convey melt to a gate extending through the cavity plate to a cavity, and valve member actuating means to reciprocate the valve member longitudinally between a retracted open position and a forward closed position in which the forward end of the valve member is seated in the gate, the improvement wherein;

the elongated valve member is hollow and receives centrally therein an elongated pin having a forward end and a rear end, the pin being securely mounted in a fixed position wherein the forward end of the pin is centrally received in the gate with a space therearound which provides a stream of melt with a hollow center flowing through the space around the forward end of the pin into the cavity when the valve member is retracted to the open position, the pin having a hollow central portion extending from an inlet near the rear end of the pin to an outlet at the forward end of the pin, whereby pressurized gas received at the inlet to the hollow pin flows through the outlet into the hollow center of the stream of melt flowing into the cavity.

2. An injection molding apparatus as claimed in claim 1 wherein the outlet at the forward end of the hollow pin comprises a porous portion seated in the forward end of the pin to allow a sufficient flow of gas outwardly therethrough into the cavity while preventing melt flowing inwardly from the cavity into the central hollow portion of the pin.

3. An injection molding apparatus as claimed in claim 2 wherein the rear end of the fixed pin extends rearwardly from the rear end of the hollow reciprocable valve member into a fixed manifold member wherein the rear end of the pin is securely located.

4. An injection molding apparatus as claimed in claim 3 wherein the inlet to the central hollow portion of the pin comprises an opening through the valve member which connects to the central hollow portion of the pin through a circumferential space around a reduced diameter portion of the pin.

5. An injection molding apparatus as claimed in claim 4 wherein at least one duct extends between the circumferential space around the reduced diameter portion of the pin and the central hollow portion of the pin.

6. An injection molding apparatus as claimed in claim 5 wherein the rear end of the valve member is secured to a movable yoke which extends through a transverse opening in the manifold, the yoke having outer ends each being connected to an actuating piston, the pistons being actuable in unison according to a predetermined cycle to reciprocate the yoke and the attached valve member between the open and closed position, the yoke having a gas duct extending from an external source to convey gas to the opening through the valve member leading to the central hollow portion of the fixed pin.

7. An injection molding apparatus as claimed in claim 3 wherein an outwardly extending gas conduit extends from a lateral opening in the valve member, the lateral opening in the valve member being in continuous communication with an opening extending through the pin to the central hollow portion of the pin.

8. An injection apparatus as claimed in claim 7 wherein the opening through the pin is a slot extending through the pin.

9. An injection molding apparatus as claimed in claim 7 wherein the actuating means includes a piston actuated pivotal lever which engages a split ring mounted around the valve member.

* * * * *